Aug. 15, 1967    D. J. TOMCIK ETAL    3,336,447
ELECTRIC ORGAN CHORD SWITCHES INCLUDING
CONDUCTING VINYL PLASTIC

Filed Feb. 3, 1964    5 Sheets-Sheet 1

Inventors
Daniel J. Tomcik
Delois R. Coplen
By:
Stone, Nierman,
Burmeister & Zummer
Attorneys Aug. 15, 1967  D. J. TOMCIK ETAL  3,336,447
ELECTRIC ORGAN CHORD SWITCHES INCLUDING
CONDUCTING VINYL PLASTIC
Filed Feb. 3, 1964  5 Sheets-Sheet 5

Inventors
Daniel J. Tomcik
Delois R. Copten
By: Stone, Nierman,
Burmeister & Zummer
Attorneys

United States Patent Office 3,336,447
Patented Aug. 15, 1967

3,336,447
ELECTRIC ORGAN CHORD SWITCHES INCLUDING CONDUCTING VINYL PLASTIC
Daniel J. Tomcik and Delois R. Coplen, Buchanan, Mich., assignors to Electro-Voice, Incorporated, Buchanan, Mich., a corporation of Indiana
Filed Feb. 3, 1964, Ser. No. 342,083
15 Claims. (Cl. 200—5)

The present invention relates generally to electrical musical instruments, and in particular to electric organs which are provided with switching mechanisms for producing chords upon actuation of a single switch control mechanism.

Chord organs have been known prior to the present invention, and Patent No. 3,098,888 to Daniel J. Tomcik entitled, Electric Organ, discloses one type of chord organ in which a plurality of single throw multi-pole switches are used to interconnect the electrical output of a plurality of tone generators. The multi-pole single throw switches are normally open, and closing the switches connects the output of the electrical generators to the input amplifier. In the electric organ disclosed in the Tomcik patent a separate electrical generator is utilized for each note of the uppermost octave of the instrument, and the same notes in the lower octaves are generated by frequency dividers so that all of the notes in all of the octaves are simultaneously available.

Electric organs have also been constructed prior to the present invention in which a single oscillator is utilized to generate a plurality of different notes on a time sharing basis. An electric organ which utilizes a single oscillator to produce more than one note is only capable of producing at any given time one note for each oscillator, and the notes for this reason which are generated by a single oscillator are usually selected in a sequence of adjacent notes. It is an object of the present invention to provide an improved chord organ utilizing a plurality of oscillators or tone generators which produce a plurality of notes on a time sharing basis.

In electric organs which utilize tone generators which produce a plurality of different notes, it is often desirable to employ normally closed switches, and therefore it becomes necessary to provide normally closed single throw multi-pole switches to produce chords with such electric organs. It is an object of the present invention to provide an improved normally closed multi-pole single throw electrical switch.

Electrical switches have often caused contact problems in electrical organs as well as other types of electrical equipment. It is a further object of the present invention to provide an improved electrical switch construction which is adapted for use in multiple pole and multiple throw electrical switches.

In addition, it is an object of the present invention to provide an improved mechanism for producing chords in an electrical organ, particularly an electrical organ in which the tone generators produce a plurality of tones on a time-sharing basis.

These and further objects of the present invention will become readily apparent from a further consideration of this disclosure, particularly when viewed in the light of the accompanying drawings, in which.

Figure 1:
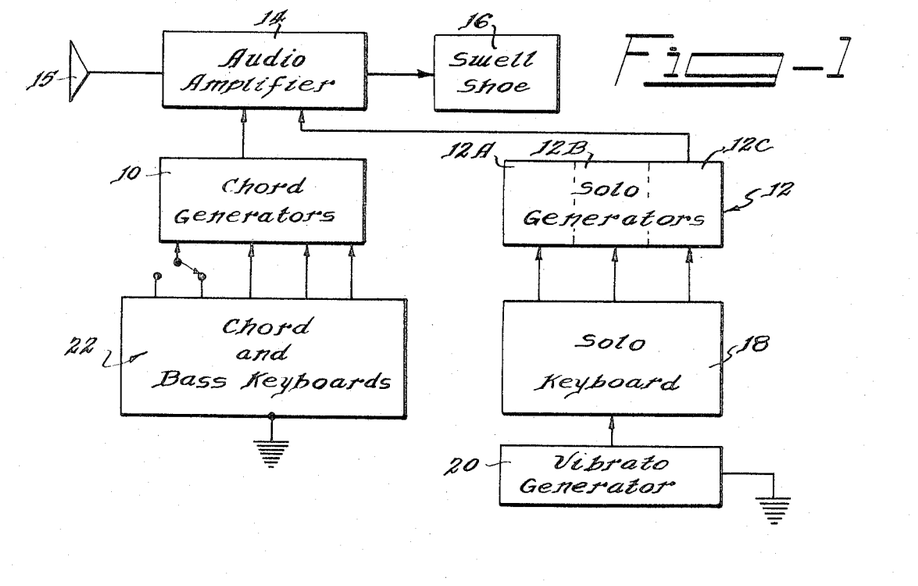
FIGURE 1 is a block schematic circuit diagram of an electrical organ constructed according to the teachings of the present invention.

The general organization of the electric organ constituting the present invention is set forth in the block diagram of FIGURE 1. As indicated in FIGURE 1, the tone generators for producing the notes of the electric organ are divided into two groups designated the chord generators 10 and the solo generators 12. The outputs of the chord generators 10 and the solo generators 12 are electrically connected to an audio amplifier 14, and the output of the audio amplifier 14 is electrically connected to a loud speaker 15 which converts the electrical signals into acoustical energy. A swell shoe 16 is electrically connected to the audio amplifier 14 to vary the amplitude of the output of the audio amplifier in accordance with the position of the swell shoe 16.

The solo generators are divided into three groups, designated 12A, 12B, and 12C, and each of these groups 12A, 12B, and 12C, are independently controlled by the solo keyboard 18. The solo keyboard connects the solo generators to the return electrode, or ground to set the generators into oscillation, as will be more fully described hereinafter. A vibrato generator 20 is electrically connected between the solo keyboard and the return electrode to impress upon the electrical output of the solo generators an amplitude variation at a vibrato rate. Also, a chord keyboard and bass keyboard in a common assembly and designated 22 is electrically connected between the chord generators 10 and the return electrode for controlling the chord generators 10.

Figure 2:
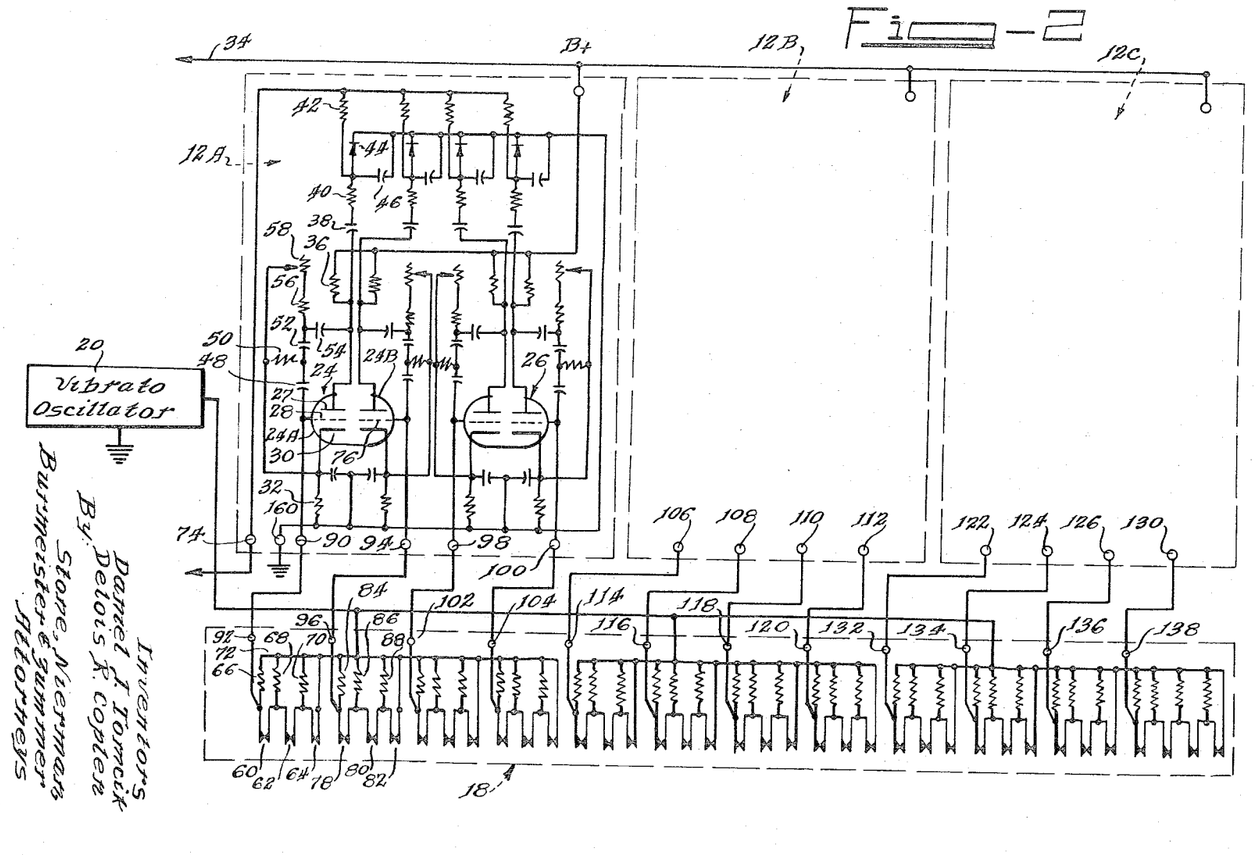
FIGURE 2 is a schematic electrical circuit diagram of the solo generators and solo keyboard and vibrato generator illustrated in block diagram in FIGURE 1.

FIGURE 2 illustrates the manner in which the solo keyboard 18 and solo generators 12 are interconnected. The solo generators are constructed in three separate modules designated 12A, 12B, and 12C. Except for the values of the components employed, these modules 12A, 12B, and 12C are identical, and the components are varied for the purpose of generating different frequencies. For this reason, only module 12A will be described in detail.

Module 12A contains four audio generators, and each of the audio generators utilizes a triode section of one of two vacuum tubes designated 24 and 26. The vacuum tube 24 has two sections designated 24A and 24B, and each of the sections has a plate 27, grid 28, and cathode 30. The cathode 30 is connected to ground, or the return electrode, through a resistor 32, and the plate 27 is connected to the positive terminal of a power supply, designated B+ and carrying reference numeral 34, through a plate resistor 36. The audio output from the tone generator is taken from the plate 27 through a capacitor 38, resistor 40, and the coupling resistor 42. To convert the sine wave output of the tone generator to a saw-tooth wave or a wave rich in harmonics, a clipping diode 44 is connected between the resistors 40 and 42 to ground to pass positive charges from this junction to ground, and a capacitor 46 is connected in parallel with the clipping diode 44.

The grid 28 of vacuum tube section 24A is connected to the cathode 30 through a serially connected capacitor 48 and resistor 50. Also, the junction between the capacitor 48 and resistor 50 is connected to the plate 27 through serially connected capacitors 52 and 54. The junction between capacitors 52 and 54 is connected to the cathode 30 by a resistor 56 and a potentiometer 58 connected in series.

The grid 28 is also connected to the return electrode or ground through the low impedance output circuit of the vibrato oscillator 20 and any one of three key switches designated 60, 62, or 64 or any one of three resistors designated 66, 68, and 70 of the solo keyboard 18. The switches 60, 62, and 64 are single pole single throw normally closed switches that are actuated by the keys of the solo keyboard. Each of the switches 60, 62, and 64 has two terminals, and one of the terminals of the switch 60 is connected to the grid 28 of vacuum tube section 24A while the other terminal of the switch 60 is connected to one terminal of switch 62. In like manner, the other terminal of switch 62 is connected to one terminal of switch 64, and the other terminal of switch 64 is connected to a common bus 72 which is essentially at ground potential since it is connected in the output circuit of the vibrato oscillator 20. One terminal of each of the resistors 66, 68, and 70 is connected to this bus 72, and the other terminal of one of the resistors is connected to the first terminal of the switch 60, the other terminal of resistor 68 is connected to the first terminal of switch 62, and the other terminal of resistor 70 is connected to the first terminal of switch 64. In this manner, the grid 28 is connected to the return electrode or ground through the switches 60, 62, and 64 in the absence of actuation of one of the switches. However, if switch 60 is actuated, the grid 28 is connected to ground through resistor 66, if only switch 62 is actuated, the grid 28 is connected to ground through resistors 66 and 68 connected in parallel, and if only switch 64 is actuated, the grid 28 is connected to ground through resistors 66, 68, and 70 connected in parallel.

The frequency of the oscillator employing vacuum tube section 24A is controlled by the values of resistor 40, resistor 36, variable resistor or potentiometer 58, resistor 56, resistor 50, and if one of the switches 60, 62, or 64 is open, the resistor of the group of resistors 66, 68, and 70 connected in the circuit. This group of resistors controls the charging rate of capacitor 48, and hence the frequency at which the oscillator employing vacuum tube section 24A oscillates.

It will be noted that vacuum tube section 24B is connected in an identical circuit and has an output connected to the same output terminal 74 as the output of the tone generator employing vacuum tube section 24A. Also, vacuum tube section 24B has a grid 76 which is connected to ground through the vibrato generator 20 by means of three switches 78, 80, and 82, and three frequency controlling resistors 84, 86, or 88, in identical manner to that previously described above for the tone generator employing vacuum tube section 24A. Since the module 12A is separate from the solo keyboard 18, the tone generator employing vacuum tube section 24A has a grid control terminal 90 on the module 12A which is electrically connected to a terminal 92 on the solo keyboard. Vacuum tube section 24B is provided with a control terminal 94 connected to a terminal 96 on the solo keyboard. In like manner, vacuum tube 26 is connected in two tone generator circuits having control terminals 98 and 100 which are connected to terminals 102 and 104 on the keyboard, respectively.

Module 12B is provided with four control terminals 106, 108, 110, and 112 which are connected to terminals of the solo keyboard 18 designated 114, 116, 118, and 120. In like manner, module 12C is provided with four control terminals designated 122, 124, 126, and 130, and these terminals are connected to terminals designated 132, 134, 136, and 138 on the solo keyboard 18.

Figure 3:
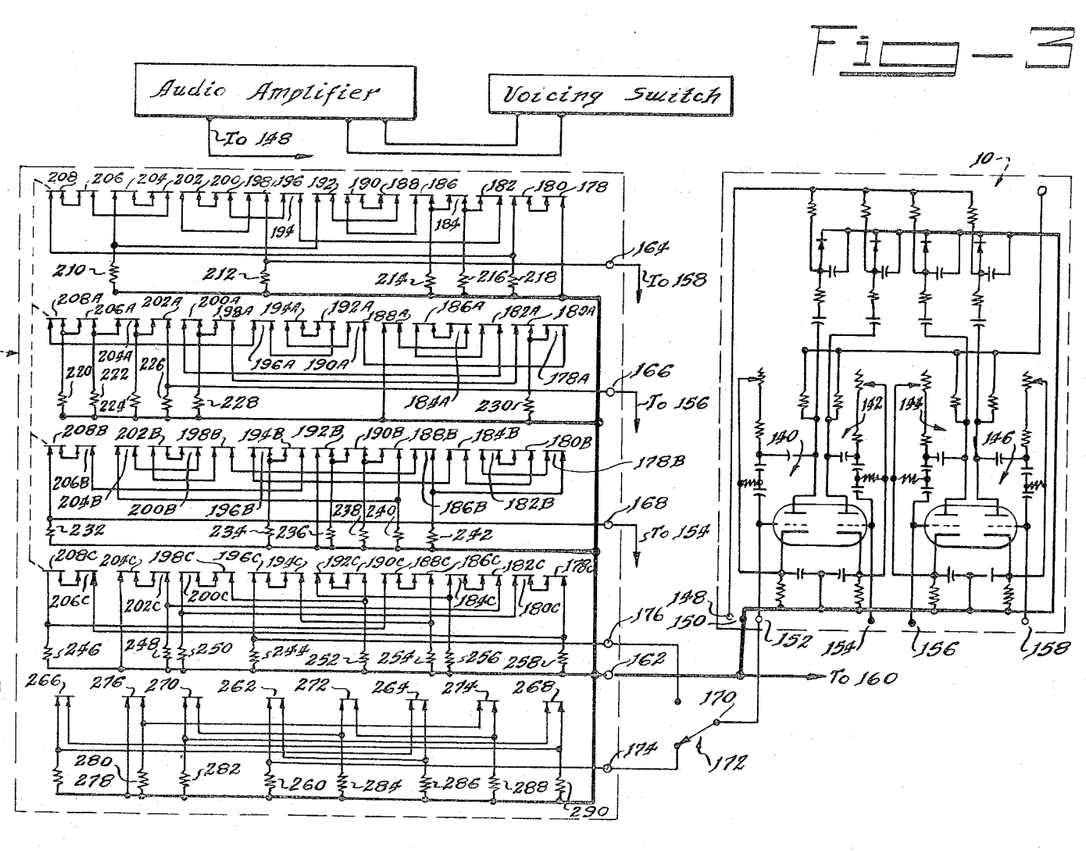
FIGURE 3 is a schematic electrical circuit diagram of the chord generators and chord and base keyboard illustrated in block diagram in FIGURE 1.

The chord generators 10 are illustrated in schematic circuit diagram in FIGURE 3, and it is to be noted that the chord generators 10 comprise four tone generators designated 140, 142, 144, and 146. Each of the tone generators 140, 142, 144, and 146 is identical in circuit design to the tone generator described above in connection with vacuum tube section 24A for the solo generators. Hence, the chord generators 10 have an output terminal 148, a ground terminal 150, and four keying or control terminals 152, 154, 156, and 158. The output terminal 148 is electrically connected to the audio amplifier 14 to transmit the generated electrical signals from the chord generators 10 to the audio amplifier input. The ground terminal 150 is connected to the grounded terminal of the solo generators, designated 160, and to the grounded terminal 162 of the chord and bass keyboard assembly 22. In like manner, the keying terminals 154, 156, and 158 are electrically connected to input terminals 164, 166, and 168 of the chord and bass keyboard assembly. The keying terminal 152 is connected to the pole terminal 170 of a single pole double throw switch 172, and the stationary terminals of the switch 172 are connected to input terminals 174 and 176, respectively, of the chord and bass keyboard assembly.

The input terminal 164 of the chord and bass keyboard assembly 22 is electrically connected in a series circuit to the ground terminal with a plurality of normally closed single pole single throw electrical switches, 16 such switches being utilized in the particular construction illustrated, one for each note capable of being reproduced by the chord generators 10. These 16 normally closed switches are designated 178, 180, 182, 184, 186, 188, 190, 192, 194, 196, 198, 200, 202, 204, 206, and 208. One of the terminals of switch 178 is connected to the ground terminal 162. Five resistors designated 210, 212, 214, 216, and 218 are connected between different switches and the ground terminal and are utilized in the grid circuit of the tone generator 146 to control the frequency of that tone generator. The resistor 212 is connected in the circuit whenever any of the switches 178 through 208 is open, and is the only resistor connected between the grid and ground when one or more of the switches designated 196, 200, 198, 194, or 182 is opened, since the resistor 212 is connected to one of the terminals of switch 196. The resistor 216 is connected to one of the terminals of switches 182 and 184, and hence is connected in parallel with resistor 212 when switch 184 is open. Resistor 214 is connected between ground and the junction of switches 184 and 186, and hence is connected in parallel with resistors 212 and 216 when one or more of the switches designated 186, 190, 188, 192 is open. The resistor 210 is connected between ground and the junction between switches 192 and 204, and hence resistor 210 is connected in parallel with resistors 212, 216, and 214 when any one of the switches 204, 202, 206, or 208 is open. Resistor 218 is connected between ground and the junction between resistors 208 and 180, and hence resistor 218 is connected in parallel with resistors 212, 216, 214, and 210 when either of the switches 180 or 178 is open. Depending upon which of the switches is open, the tone generator 146 will produce a single electrical signal with one of five frequencies determined by the effective value of the resistance between terminal 164 and the ground terminal 162.

The tone generator 144 is connected to the terminal 166 of the chord and bass keyboard assembly 22. The terminal 166 is connected in series with normally closed single pole single throw switches 178A, 180A, 182A, 184A, 186A, 188A, 190A, 192A, 194A, 196A, 198A, 200A, 202A, 204A, 206A, and 208A to the ground terminal 162. One terminal of switch 188A is directly connected to the ground terminal 162. Six frequency control resistors designated 220, 222, 224, 226, 228, and 230 are connected between certain of these switches and the ground terminal. Resistor 220 is connected between switch 208A and ground, the resistor 212 is connected between the junction of switches 206A and 204A and ground, the resistor 224 is connected between the junction of switches 204A and 202A and ground, the resistor 226 is connected directly between the terminal 166 and the ground terminal 162, the resistor 228 is connected between the junction of switch 200A and switch 198A and ground, and the resistor 230 is connected between the junction of switch 178A and switch 180A and ground. As described in connection with the switches associated with keying terminal 164, when any one of the switches associated with terminal 166 is opened, one or more of the resistors 222 through 230 is connected between the terminal 166 and the terminal 162 to control the frequency of tone generator 144.

In like manner, terminal 168 of the chord and bass keyboard assembly is connected to the ground terminal 162 through a resistor 232 and serially connected switches designated 178B, 180B, 182B, 184B, 186B, 188B, 190B, 192B, 194B, 196B, 198B, 200B, 202B, 204B, 206B, and 208B. A resistor 234 is connected between ground and the junction of switches 194B and 196B. One terminal of switch 192B is connected to ground directly, and the terminal of switch 192B connected to switch 190B is connected to ground through a resistor 236. The junction of switches 188B and 190B is connected to ground through a resistor 238, and the other terminal of switch 188B is connected to ground through a resistor 240. A sixth frequency control resistor 242 is connected between the junction of switches 186B and 178B and ground.

In like manner, the terminal 176 of the chord and bass keyboard assembly 22 is connected to the ground terminal 162 through a resistor 244 and a plurality of electrical switches connected in series and designated 196C, 194C, 186C, 188C, 208C, 206C, 178C, 180C, 200C, 198C, 190C, 192C, 184C, 182C, 202C, and 204C. All of the switches designated 178C through 208C are normally closed single pole single throw switches. A resistor 246 is connected between the switch 208C and ground, a resistor 248 is connected between the switch 202C and ground, a resistor 250 is connected between the switch 200C and ground, a resistor 252 is connected between the switch 190C and ground, a resistor 254 is connected between the switch 186C and ground, a resistor 256 is connected between the switch 184C and ground, and a resistor 258 is connected between the switch 178C and ground. In this manner, the value of the resistance between terminal 176 and 162 may be varied from zero when all switches are closed to eight different values of resistance depending upon which of the switches is open by connecting one or more of the resistors 246 through 258 in parallel with resistor 244.

The switches designated 178, 178A, 178B, and 178C are ganged together as are all other switches bearing the same reference numeral and a different letter designation. Since all of the tone generators 140, 142, 144, and 146 have a common output terminal in terminal 148, depressing or actuating any one of the gang switches, such as 208, 208A, 208B, and 208C will produce four electrical outputs simultaneously on the output terminal 148 which will produce the chord designated by that key. In one particular construction of the electric organ herein disclosed, the electrical ganged switches produce the chords designated E♭, E♭ minor, B♭, B♭ minor, F, F minor, C, C minor, G, G minor, D, D minor, A, A minor, E, E minor.

For interpreting certain types of music, it is desirable to have available means to separately actuate the bass note of the chord and thus provide for rhythm variations. For this purpose, the switch 172 has been provided to switch the keying terminal 152 of the tone generator 140 from the chord switch mechanism coupled through terminal 176 of the chord and bass keyboard assembly to separately actuated bass keys connected to terminal 174 of the chord and bass key assembly 22. The terminal 174 is connected to the ground terminal 162 through a resistor 260, or the serially connected normally closed electrical switches designated 262, 264, 266, 268, 270, 272, 274, 276, connected between the terminals 174 and 162 serially. A resistor 278 is connected between the switch 266 and ground, a resistor 280 is connected between the switch 276 and ground, a resistor 282 is connected between the switch 270 and ground, a resistor 284 is connected between the switch 272 and ground, a resistor 286 is connected between the switch 264 and ground, a resistor 288 is connected between the switch 274 and ground, and a resistor 290 is connected between the switch 268 and ground. With this construction, the tone generator 140 can be made to produce any one of eight notes since opening any one of the switches designated 262 through 276 connects one or more of the resistors designated 278 through 290 in parallel with the resistor 260 to change the resistance between the terminals 174 and 172.

The tone generators 140, 142, 144, and 146 of the chord generator 10 and the tone generators of the solo generators 12 are all phase shift resistance-capacitance oscillators. Considering the oscillator utilizing vacuum tube section 24A, the vacuum tube section forms an electron valve in which the cathode 30 may be considered as a current return electrode. The plate to cathode forms one electrical circuit and the grid to cathode a second electrical circuit which is coupled to the first electrical circuit by the capacitor 54. In this manner, an out of phase electrical signal is fed from the output plate circuit to the input grid circuit, and the magnitude of the grid resistor and other resistors and capacitors in this circuit determines the frequency of oscillation. The frequency of oscillation is determined by the values of capacitor 54, capacitor 52, and capacitor 48 and resistors 50, 56, and 58, resistors 66, 68, and 70.

The tone generators generate an essentially sine wave output which is tapped from the plate circuit by capacitor 38. The diode 44 forms a half wave rectifier to convert the essentially sine wave output to an output rich in harmonics suitable for use with the formant method of voicing the organ.

Figure 4:
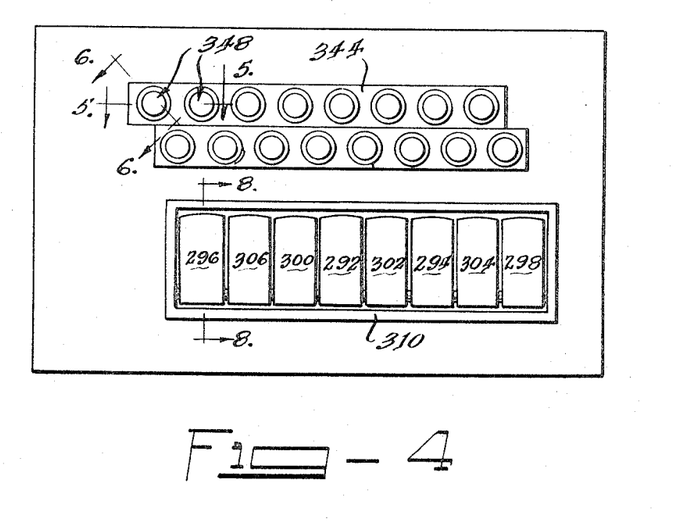
FIGURE 4 is an elevational view of the chord and bass keyboards of the electric organ illustrated in FIGURES 1 through 3.
Figure 8:
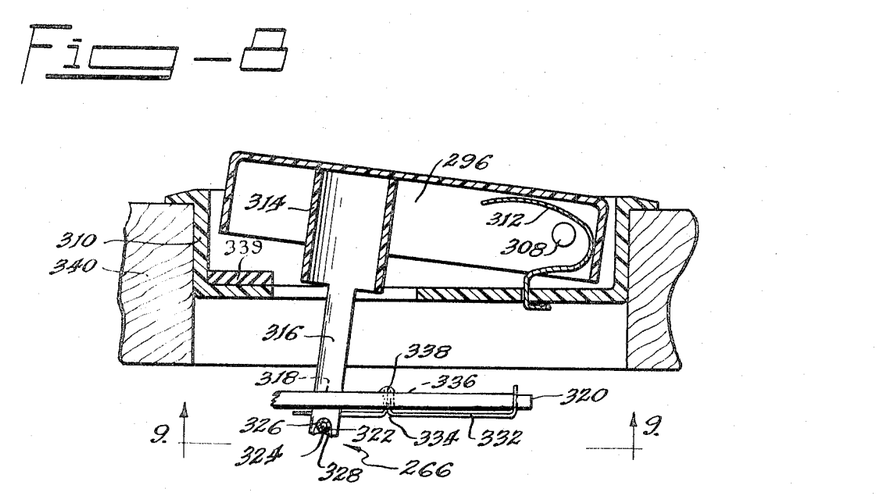
FIGURE 8 is a sectional view of one of the bass keyboard switch mechanisms taken along the line 8—8 of FIGURE 4.
Figure 9:
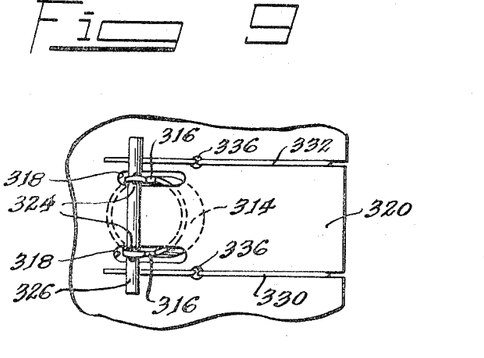
FIGURE 9 is an elevational view of the switch mechanism of FIGURE 8 taken along the line 9—9 of FIGURE 8.

FIGURE 4 illustrates in elevation the chord and bass keyboard of the electric organ. Each of the switches 262, 264, 266, 268, 270, 272, 274, and 276 has an actuating mechanism driven by a key designated 292, 294, 296, 298, 300, 302, 304, and 306, respectively. FIGURE 8 illustrates in section the construction of the switch 266, its key 296, and actuating mechanism, and FIGURE 9 is a bottom view of the switch illustrated in FIGURE 8. It is to be noted that the key 296 is pivoted on a shaft 308 at one end which is mounted on a rectangular frame 310. A leaf spring 312 spring biases the key 296 upwardly to maintain the switch in closed position. The key has a cylindrical portion 314 extending downwardly from adjacent to the opposite end of the key 296 from the pin 308, and a pair of legs 316 depend from the cylindrical portion 314 in a plane parallel to the pivotal axis of the key. The legs 316 pass through openings 318 in a printed circuit board 320, and terminate in a slot 322 on the opposite side of the terminal board 320 from the key 296. A rod 324 which is provided with a cylindrical sleeve 326 on the exterior surface thereof of electrically conducting material, such as electrically conducting vinyl plastic is positioned within the slots 322 and secured in position by layers 328 of cement. The rod 324 and its plastic sleeve 326 extend beyond the ends of the arms 316 and confront a pair of spring electrical contacts 330 and 332. The contacts 330 and 332 are also mounted on the printed circuit board 320 by a crimp 334 disposed in each of the contact wires 330 and 332 which passes through an aperture 336 in the printed circuit board 320 and a mass 338 of solder is applied to the crimp 334 on the side of the board opposite the remainder of the contact wires 330 and 332 to maintain these wires in position. As viewed in FIGURE 8, the contact wires 330 and 332 are spring biased downwardly from the crimp 334 thereof to force the wires into contact with the electrically conducting sleeve 326 carried by the arms 316. However, when the key 296 is depressed, the sleeve 326 on the rod 324 is pivoted downwardly from the printed circuit board 320 a sufficient distance to disengage the contact wires 330 and 332, thereby opening the switch formed by the contact wires 330 and 332 and the electrically conducting sleeve 326. A pad 339 of compliant material mounted on the frame 310 stops downward travel of the key 296 without a jerk or undesirable noise.

Figure 5:
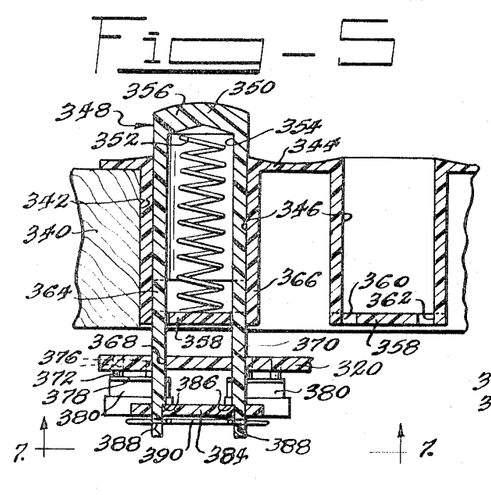
FIGURE 5 is a sectional view of a fragment of the chord keyboard taken along the line 5—5 of FIGURE 4.
Figure 6:
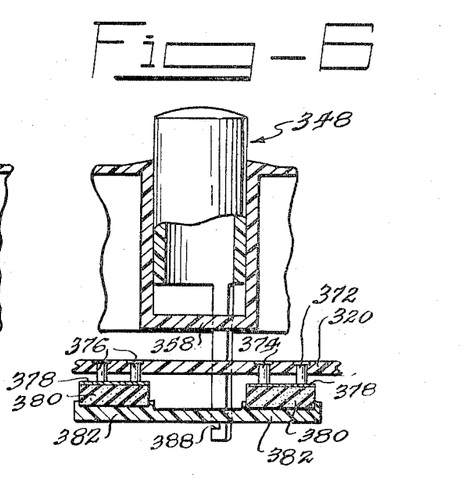
FIGURE 6 is a sectional view of one of the chord switches taken along the line 6—6 of FIGURE 4.
Figures 7, 10:
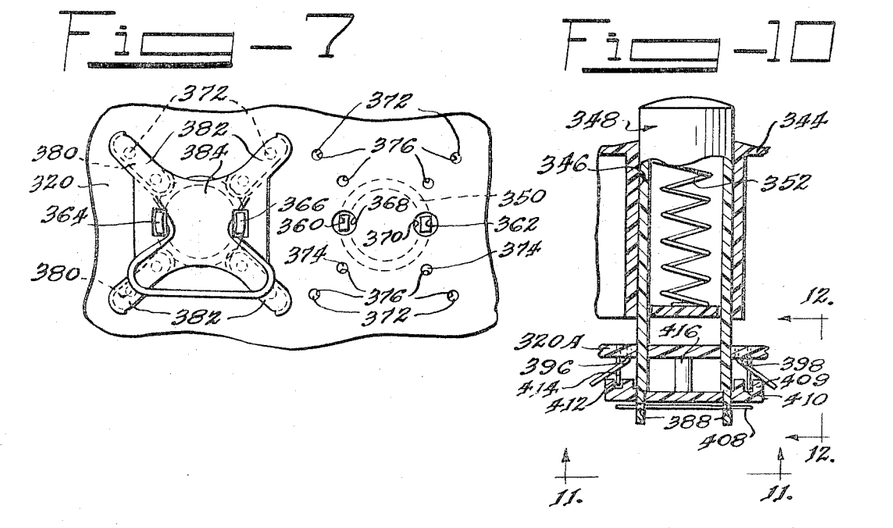
FIGURE 7 is an elevational view taken along the line 7—7 of FIGURE 5.
FIGURE 10 is a fragmentary sectional view of a modified form of chord switch mechanism taken all along a line corresponding to that of FIGURE 5.

FIGURES 5, 6, and 7 illustrate the mechanical construction for the switches 208, 208A, 208B, and 208C. These switches are mounted on the same mounting board 340 utilized to mount the frame 310 of the bass switches, and the board 340 is provided with an elongated slot 342 which accommodates a strip 344 containing a cylindrical recess 346 for each of the chord switches, the chord switches being designated 348. Each of the chord switches 348 has a cylindrical key 350 which is translatedly disposed within one of the recesses 346, and a spiral spring 352 is disposed within a hollow 354 within the key 350 and extends to abut the top 356 of the key 350 and the base 358 of the recess 346. The base 358 of the recess 346 is provided with two apertures 360 and 362 which are located adjacent to the cylindrical walls of the recess 346 and on opposite sides thereof. A pair of legs 364 and 366 integral with the key 350 extend parallel to the axis of the cylindrical recess 346 and extend through the apertures 362 and 360, respectively. The legs 364 and 366 also pass through openings 368 and 370 disposed in the printed circuit board 320 which is mounted spaced from and parallel to the board 340.

The printed circuit board 320 carries four pair of spaced contacts, each pair being designated 372 and 374, and the contacts 372 and 374 extend through apertures 376 in the printed circuit board 320 and are anchored therein. A layer of electrically conducting vinyl plastic 378 confronts each pair of contacts 372 and 374 and is mounted on a pad 380 of resilient compliant material. The pad 380 is mounted on one of four arms 382 of an electrically insulating plate 384 which is in turn mounted on the two legs 364 and 366 of the key. The legs 364 and 366 are provided with a shoulder 386 disposed between the plate 384 and the printed circuit board 320 to prevent the plate 384 from sliding up the legs 364 and 366 into contact with the printed circuit board 320. The legs are also provided with slots 388 located on the side of the plate 384 opposite the shoulders 388 which accommodate a wire clamp 390. The plate is, therefore, securely positioned between the clamp 390 and the shoulders 386.

In its unactuated or normal position, the plate 384 forces the electrically conducting pads 378 into abutment with the contacts 372 and 374 to maintain the four switches formed by the assembly closed. One of the pairs of contacts 372 and 374 is the stationary contacts of switch 208, another pair of contacts is the stationary contacts of switch 208A, a third pair of contacts 372 and 374 is the stationary contacts of the switch 208B, and the fourth pair of contacts is the stationary contacts of the switch 208C. When the key 350 is depressed against the bias of the spiral spring 352, the plate 384 is translated downwardly from the printed circuit board 320 to move the compliant pads 380 downwardly and likewise the electrically conducting pads 378 to open all four of these switches simultaneously.

Electrically conducting vinyl plastic has proven to be desirable in this construction, since it is somewhat compliant as well as electrically conducting. The compliant or resilient pads 380 are utilized between the plate 384 and the electrically conducting pads 372 in order to increase the available compliance of the switch and to make certain that the electrically conducting pad 372 will be oriented into abutment with both of the contacts 372 and 374. Other types of electrically conducted material may also be utilized for the electrically conducting pads 372, for example, electrically conducting rubber. The compliant pads 378 have been formed of foam plastic material, although foam rubber or other compliant and resilient materials may be utilized.

Figure 11:
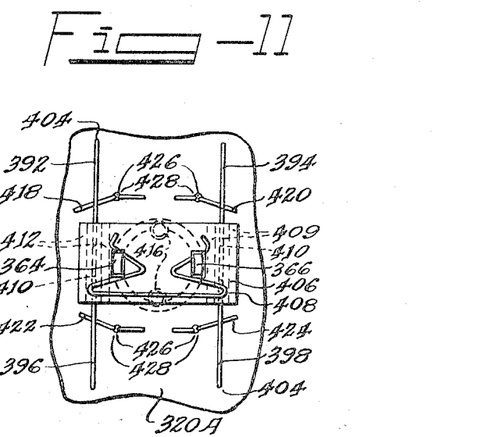
FIGURE 11 is a sectional view of the switch mechanism of FIGURE 10 taken along the line 11—11 of FIGURE 10.
Figure 12:
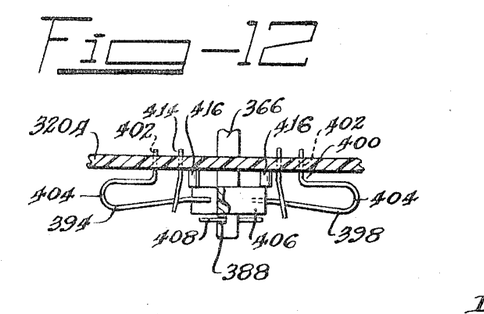
FIGURE 12 is a sectional view taken along the line 12—12 of FIGURE 10.

FIGURES 10, 11, and 12 illustrate another embodiment of a chord switch suitable for use in the electric organ of the present invention. The chord switch is illustrated mounted in the slot 342 of the board 340, as illustrated for the embodiment of FIGURES 5 through 7. Also, the molded strip 344 is employed with cylindrical recesses 346 and a hollow key 348 identical to that previously disclosed. The key 348 also employs a spiral spring 352 to spring bias the key upwardly from the molding 344. A flat printed circuit board 320A is mounted parallel to and adjacent to the board 340 in a manner similar to the printed circuit board 320.

The printed circuit board 320A is provided with four electrically conducting spring wires designated 392, 394, 396, and 398. Each of the wires 392, 394, 396, and 398 is provided with a crimp 400 adjacent to one end thereof, which passes through an aperture 402 in the printed circuit board 320A, and the crimp 400 is secured in the aperture 402 to mount the spring contact wire. Each of the wires 392, 394, 396, and 398 has a bend 404 of slightly less than 180° which provides a spring bias by way of permanent set in the wire and orients the wire in a direction toward the plane of the legs 364 and 366 of the key 348. The wires 392 and 396 are disposed in one plane normal to the plane of the legs 364 and 366 and disposed on the side of the leg 364 opposite the leg 366, and the wires 394 and 398 are disposed in a second plane parallel to the plane of the first wires and disposed on the opposite side of the leg 366 from the leg 364. The ends of the wires 392 and 396 confront each other but are spaced from each other so that the wires are electrically insulated from each other. In like manner, the ends of the wires 394 and 398 confront each other and are in spaced alignment with each other to provide electrical insulation between these wires also.

A plate 406 is mounted on the legs 364 and 366 between the shoulders 386 thereof and a wire clamp 408 which engages the slots 388 therein. The plate 406 is provided with a pair of ribs 409 forming a channel 410 aligned with and engaging the wires 394 and 398 and disposed normal to the plane of the legs 364 and 366 to form a guide for these wires. In like manner, a second pair of ribs 412 disposed on the opposite edge of the plate 406 form a channel 414 for the wires 392 and 396, and these wires are engaged and guided within the channel 414. A pair of stop-rods 416 extend between the plate 406 and the confronting surface of the printed circuit board 320A to limit movement of the plate 406 toward the printed circuit board. In this manner, the spring 352 causes the contact wires 392, 394, 396, and 398 to assume a position in abutment with the plate 406 exerting spring bias on the plate 406 at all times, but in the absence of actuation of the key 348, the contact wires are bent in a direction toward the printed circuit board 320.

Four spring terminal wires 418, 420, 422, and 424 are anchored at one end on the printed circuit board 320A and extend into confrontation with the contact wires 392, 394, 396 and 398, respectively. The terminal wires 418, 420, 422, and 424 are each provided with a crimp 426 adjacent to their mounted end, and the crimp 426 is mounted within an aperture 428 in the printed circuit board 320A. The apertures 428 are disposed in the printed circuit board 320A adjacent to the plane of their respective contact wires and between this plane and the parallel plane of the other contact wires. The terminal wires extend from the apertures 428 across the plane of the contact wires and have a permanent set resulting in spring bias in a direction toward the contact wires. Each of the terminal wires 418 traverses the plane of its contact wire perpendicularly and is positioned to engage its contact wire when the key 348 is under the control of the spiral spring 352 and exerts spring bias against the spring bias of its contact wire. However, when the key 348 is pressed, the spring bias of the terminal wire is insufficient to cause the terminal wire to move with the contact wire, causing the two to become spaced and electrically insulated from each other. The crimp 426 of the terminal wire is used for one contact of the switch and the crimp 402 of the contact wire is used for the other terminal of each switch. In this manner, the terminal wires 418, 420, 422, and 424 form with the contact wires 392, 394, 396, and 398, respectively, four single pole single throw ganged electrical switches which may be used advantageously and conveniently in the electrical organ illustrated in FIGURES 1 through 3. Further, the spring biased key 348 provides the desired feel for an electrical musical instrument of this type.

From the foregoing disclosure, those skilled in the art will readily appreciate many advantages of the foregoing electric organ and switch structures in addition to those here set forth. In addition, those skilled in the art will readily devise many modifications of the electric organ and switch structures herein before specified. It is, therefore, intended that the scope of the present invention be not limited by the foregoing disclosure, but rather only by the appended claims.

The invention claimed is:

1. An electrical chord organ comprising a plurality of electrical tone generators, each tone generator having an electron valve with a current return electrode, a control electrode and an output electrode, a first electrical circuit extending between the current return electrode and the output electrode, a second electrical circuit extending between the current return electrode and the control electrode, phase shifting means for electrically coupling the first circuit to the second circuit, said second electrical circuit including a plurality of normally closed single pole single throw switches connected in series and a plurality of resistors connected in parallel with the switches, each resistor being connected in parallel with a different switch, each of said tone generators oscillating when one of the switches thereof is opened at a frequency determined by the value of the resistance between the control and current return electrodes, each of said switches having an actuation member and the actuation member of each switch connected to one tone generator being ganged to the actuation member of one switch connected in the second electrical circuit of each of the other tone generators.

2. An electrical chord organ comprising the combination of claim 1 wherein each of the first circuits of each tone generator is electrically connected to a common output terminal in series with a resistor, in combination with a diode connected between the junction of the resistor and first electrical circuit and the current return electrode.

3. An electrical chord organ comprising the combination of claim 1 wherein the ganged electrical switches comprise a board of electrically insulating material, a plurality of electrically conducting pins spaced from and adjacent to each other, mounted on a common surface of said board and protruding therefrom, said pins being electrically insulated from each other and forming stationary contacts for said switch, a pad of electrically conducting plastic material, actuation means attached to said pad and mounted on the board for positioning said pad in abutment with the pins to electrically interconnect the pins and positioning said pad at a distance from said pins to electrically disconnect said pins from each other.

4. An electrical switch comprising a board of electrically insulating material, a plurality of electrically conducting pins spaced from and adjacent to each other mounted on a common surface of said board and protruding therefrom, said pins being electrically insulated from each other and forming stationary contacts for said switch, a pad of electrically conducting plastic material, actuation means attached to said pad and mounted on the board for positioning said pad in abutment with the pins to electrically interconnect the pins and positioning said pad at a distance from said pins to electrically disconnect said pins from each other.

5. An electrical switch comprising a flat board of electrically insulating material, a pair of electrically conducting heads protruding from one side of the board and spaced from each other, the heads forming the terminals of the switch, a flat plate, actuable means mounted on the board for mounting the plate, said means being responsive to a key to position the plate parallel and adjacent to the heads in a first position and remote therefrom in a second position, a layer of resilient material mounted on the plate confronting the heads, and a layer of electrically conducting plastic material mounted on the layer of resilient material confronting the heads and abutting the heads in the first key position of the mounting means.

6. A chord keyboard and switch assembly for an electric organ comprising a flat panel having a face, a cylindrical sleeve mounted normal to the face of the panel and extending through the panel, said sleeve having a wall normal to the axis thereof remote from the face and a pair of orifices disposed in the wall at opposite sides of the cylindrical surface of the sleeve, a hollow cylindrical cap translatably disposed within the sleeve having a closure at its end remote from the wall of the sleeve and a pair of legs parallel to the axis of the cap extending therefrom, said legs extending through the orifices in the wall, a spiral spring disposed within the cap and extending between the wall of the sleeve and the closure of the cap to spring bias the cap away from the wall, a board of electrically insulating material disposed in a fixed position normal to the axis of the sleeve, said board being provided with a pair of apertures aligned with the orifices on axes parallel to the central axis of the sleeve, the legs of the cap extending through the apertures and being translatable therein, a plurality of pairs of electrically conducting pins mounted on and extending through the board, each pin having a head protruding from the side of the board opposite the panel, the heads of each pair of pins being disposed in adjacent spaced relation, a plate of electrically insulating material mounted on the legs of the cap on the side of the board opposite the panel, said plate being parallel to the board and confronting the heads of said plurality of pairs of pins, a flat pad of compliant material mounted on the surface of the plate confronting the heads of each pair of pins, a flat layer of electrically conducting plastic material mounted on each pad, the spring yieldably driving the layers of electrically conducting material into abutment with the heads of the pins to interconnect the pins of each pair.

7. A chord keyboard and switch assembly for an electric organ comprising a flat panel having a face with an elongated slot disposed therethrough, a guide member mounted within the slot of the face having a plurality of cylindrical sleeves spaced at equal intervals along the central axis of the slot and disposed normal to the face, such sleeves extending through the panel and each of said sleeves having a wall normal to the axis of the sleeve remote from the face of the panel provided with a pair of orifices which extend through the wall at opposite sides of the cylindrical surface of the sleeve, a hollow cylindrical cap translatably disposed within each sleeve, having a closure at its end remote from the wall of the sleeve and a pair of legs extending parallel to the axis of the cap therefrom, said legs extending through the orifices in the wall, a spiral spring disposed within each cap and extending between the wall of the sleeve and the closure of the cap to spring bias the cap away from the wall, a board of electrically insulating material mounted on the panel parallel to the face thereof, said board being disposed on the side of the panel remote from the face and provided with a pair of apertures aligned with each pair of orifices along axes parallel to the central axis of each sleeve, the legs of each cap extending through the confronting apertures in the board and being translatably disposed therein, a plurality of pairs of electrically conducting pins mounted on and extending through the board adjacent to each pair of legs, each pin having a head protruding from the side of the board opposite the panel, the heads of each pair of pins being disposed in adjacent spaced insulated relation, a plate of electrically insulating material mounted on the legs of each cap on the side of the board opposite the panel, each plate being parallel to the board and confronting the heads of the plurality of pairs of pins disposed adjacent to the cap thereof, a flat pad of compliant material mounted on the surface of each plate confronting the heads of each pair of pins disposed about the cap thereof, a flat layer of electrically conducting plastic material mounted on the surface of the flat pad remote from the plate, each layer of conducting plastic material confronting the heads of a single pair of pins, a spring disposed between the wall of each sleeve and the closure of the cap disposed in said sleeve yieldably driving the layers of electrically conducting material into abutment with the heads of the pins to interconnect the pins of each pair.

8. An electrical chord organ including a chord keyboard and switch assembly comprising the combination of claim 7 in combination with a plurality of electrical tone generators, each tone generator having an electron valve with a current return electrode, a control electrode and an output electrode, a first electrical circuit extending between the current return electrode and the output electrode, a second electrical circuit extending between the current return electrode and the control electrode, phase shifting means for electrically coupling the first circuit to the second circuit, said second electrical circuit of each tone generator including a pair of pins of the chord keyboard and switch assembly connected in series and a resistor connected between said pins, the second circuit of each tone generator being connected in series with a different pair of pins and each resistor being connected between the pins of one pair of pins, each of said tone generators oscillating when the layer of conducting plastic confronting the pair of pins associated with said tone generator is spaced from said pair of pins at a frequency determined by the value of the resistance between the pins of said pair.

9. A key switch for an electrical musical instrument comprising a board of electrically insulating material, a pair of spaced electrically conducting strips mounted on said board at regions remote from the ends of said strips, the ends of said strips having a permanent set spring biasing said ends at an angle to the board, a bar of electrically conducting plastic material, and movable actuator means engaging the bar for mounting the bar confronting said ends of the strips, said actuator means having one position positioning the bar in abutment with the ends of the strips and a second position positioning the bar remote from the strips.

10. A key and switch assembly for an electrical organ comprising a panel with a flat face having an opening therethrough, a board of electrically insulating material mounted on the panel having an aperture therethrough confronting the opening in the panel, an elongated key pivotally mounted on the board having a leg remote from said end extending therefrom through the opening in the panel and aperture in the board, a rigid rod mounted on the leg on the side of the board remote from the panel, said rod being parallel to the pivotal axis of the key, a sleeve of electrically conducting plastic material disposed about the rod and secured thereto, a plurality of resilient electrically conducting strips secured to the board and disposed on the side thereof remote from the panel, said strip being disposed in planes normal to the bar and extending between the bar and board, the portion of each strip confronting the bar being at one end of said strip and remote from the region thereof secured on the board, and said portion having a permanent set disposed at an acute angle to the board, and spring bias means engaging the key urging the sleeve into abutment with the strips.

11. A key and switch assembly for an electrical organ comprising a panel with a flat face having an opening therethrough, a board of electrically insulating material mounted on the panel having a pair of apertures extending therethrough confronting the opening in the panel, an elongated key pivotally mounted at one end on the board on an axis parallel to the axis between the apertures of the board, said key having a pair of legs remote from said end extending therefrom parallel to each other through the openings in the panel and the apertures in the board, a straight rigid rod, a sleeve of electrically conducting material secured about the rod, said rod and sleeve being mounted on the legs of the key and disposed parallel to the pivotal axis of the key, said rod being disposed on the side of the board remote from the panel, a pair of parallel spaced electrically conducting resilient strips, each of said strips having a loop bent therein and terminating at one end in a portion parallel to said loop, the board being provided with a pair of bores adjacent to the apertures therethrough and each of said bores accommodating the loop of one of the strips and anchoring said strip on said board, said board having a pair of slots spaced by approximately the same distance as the bores and extending therein from an edge thereof, the one end of each of the strips engaging one of the slots to maintain the strips in parallel relationships, and the other end of each of the strips having a permanent set disposing said end at an acute angle to the board between the board and the sleeve, and spring bias means engaging the key urging the sleeve into abutment with the strips.

12. An electrical organ comprising the combination of claim 1 wherein each of the keys comprises a panel with a flat face having an opening therethrough, a board of electrically insulating material mounted on the panel having an aperture therethrough confronting the opening in the panel, an elongated key pivotally mounted on the board having a leg remote from said end extending therefrom through the opening in the panel and aperture in the board, a rigid rod mounted on the leg on the side of the board remote from the panel, said rod being parallel to the pivotal axis of the key, a sleeve of electrically conducting plastic material disposed about the rod and secured thereto, a plurality of resilient electrically conducting strips secured to the board and disposed on the side thereof remote from the panel, said strips being disposed in planes normal to the bar and extending between the bar and board, the portion of each strip confronting the bar being at one end of said strip and remote from the region thereof secured on the board, and said portion having a permanent set disposed at an acute angle to the board, and spring bias means engaging the key urging the sleeve into abutment with the strips.

13. An electrical switch comprising a board of electrically insulating material having an aperture extending therethrough, a pair of bores extending through the board adjacent to the aperture, the first bore being closer to the aperture than the second bore, a first electrically conducting strip of resilient material disposed in a first plane mounted in the second bore of the board, the second plane being at an angle to the first plane, an actuation rod extending through the aperture and engaging the end of the second strip, the first strip being disposed between the board and second strip and adapted to abut the second strip in one position of the actuator rod and be spaced from the second strip in a second position of the actuator rod.

14. An electrical switch comprising a key having a pair of parallel legs extending therefrom, means for mounting said key for movement along an axis parallel to the legs, a board of electrically insulating material having a pair of apertures adapted to acccommodate the legs, said board being mounted on the mounting means for the key with the legs of the key extending through the apertures, a plate mounted on the legs parallel to the board on the side of the board opposite the key, a plurality of pairs of bores extending through the board adjacent to the plate, one of the bores of each pair being more remote from the plate than the other bore of said pair and on the opposite side of the plate from the remote bore of another pair of bores, a first electrically conducting strip of resilient material disposed in the remote bores of each pair disposed in a first plane, said first strips having a bend therein and a generally straight end portion extending to the plate and engaging the plate, a second electrically conducting strip of resilient material mounted in the second bore of each pair and disposed in a second plane disposed at an angle to the plane of the first strip mounted in the other bore of said pair, said second strip having a generally straight portion extending between the board and the straight portion of the first strip, said first and second strips engaging when the key positions the plate near the board and disengaging when the key positions the plate remote from the board.

15. An electrical organ comprising the elements of claim 1 wherein the switches comprise a key having a pair of parallel legs extending therefrom, means for mounting said key for movement along an axis parallel to the legs, a board of electrically insulating material having a pair of apertures adapted to accommodate the legs, said board being mounted on the mounting means for the key with the legs of the key extending through the apertures, a plate mounted on the legs parallel to the board on the side of the board opposite the key, a plurality of pairs of bores extending through the board adjacent to the plate, one of the bores of each pair being more remote from the plate than the other bore of said pair and on the opposite side of the plate from the remote bore of another pair of bores, a first electrically conducting strip of resilient material disposed in the remote bores of each pair disposed in a first plane, said first strips having a bend therein and a generally straight end portion extending to the plate and engaging the plate, a second electrically conducting strip of resilient material mounted in the second bore of each pair and disposed in a second plane disposed at an angle to the plane of the first strip mounted in the other bore of said pair, said second strip having a generally straight portion extending between the board and the straight portion of the first strip, said first and second strips engaging when the key positions the plate near the board and disengaging when the key positions the plate remote from the board.

No references cited.

ROBERT K. SCHAEFER, *Primary Examiner.*

J. R. SCOTT, *Assistant Examiner.*